(12) United States Patent
Mattson (10) Patent No.: US 7,658,397 B2
(45) Date of Patent: Feb. 9, 2010

(54) COMBINED TRUCK AND TRAILER

(76) Inventor: Marlin J. Mattson, 11384-330th St. Northwest, Newfolden, MN (US) 56738

( * ) Notice: Subject to any disclaimer, the term of this patent is extended or adjusted under 35 U.S.C. 154(b) by 530 days.

(21) Appl. No.: 11/208,191

(22) Filed: Aug. 22, 2005

(65) Prior Publication Data

US 2006/0266571 A1 Nov. 30, 2006

Related U.S. Application Data

(60) Provisional application No. 60/684,709, filed on May 26, 2005.

(51) Int. Cl.
*B62D 53/00* (2006.01)
(52) U.S. Cl. .................................... 280/407
(58) Field of Classification Search ............... 280/407, 280/407.1, 411.1, 423.1, 430, 431, 433, 438.1, 280/441, 656, 149.2, DIG. 8
See application file for complete search history.

(56) References Cited

U.S. PATENT DOCUMENTS

| | | | |
|---|---|---|---|
| 2,697,614 A | * | 12/1954 | Smith ..................... 280/476.1 |
| 2,860,981 A | | 11/1958 | Ramun |
| 3,439,935 A | | 4/1969 | Guidice |
| 3,606,384 A | * | 9/1971 | Fontaine et al .............. 280/407 |
| 3,834,736 A | | 9/1974 | Dodgson |
| 4,955,629 A | * | 9/1990 | Todd et al. .................. 280/407 |
| 5,199,732 A | * | 4/1993 | Lands et al. ............. 280/407.1 |
| 5,378,007 A | | 1/1995 | Joyce |
| 6,231,064 B1 | | 5/2001 | Curry |

* cited by examiner

*Primary Examiner*—Faye M. Fleming
(74) *Attorney, Agent, or Firm*—Richard John Bartz (57) ABSTRACT

A truck and trailer combination has a trailer removably mounted on the truck frame with longitudinal and horizontal channel members secured to the truck frame and longitudinal rails fastened to the trailer. The rails have a slide fit with respect to the channel members. Lock pins connect the rails to the channel members.

35 Claims, 8 Drawing Sheets

COMBINED TRUCK AND TRAILER

CROSS REFERENCE TO RELATED APPLICATION

This application claims the benefit of U.S. Provisional Application Ser. No. 60/684,709 filed May 26, 2005.

FIELD OF THE INVENTION

This invention relates to truck and trailer coupling assemblies for supporting trailers on the frames of the trucks and containers or boxes coupled to the frames of the trucks. The coupling assemblies permit the trailers and containers to be separated from the trucks and allow the truck's fifth wheel hitches to be connected to semi-type trailers.

BACKGROUND OF THE INVENTION

Trucks known as semi-tractors have fifth wheel hitches adapted to lock onto kingpins secured to trailers. The utility of the tractors is limited to trailers equipped with fifth wheel hitch accommodating structures. The load of the trailers is distributed between the trailer wheels and the fifth wheel hitches. The longitudinal location of the fifth wheel hitches relative to the frame of the tractor determines the load distribution on the tractor. The trailers are not mounted directly on the frames of the tractors due to the articulation functions of the fifth wheel hitches. Examples of tractor-trailer combinations having fifth wheel hitches are disclosed by M. Ramun in U.S. Pat. No. 2,860,891; W. W. Grudice in U.S. Pat. No. 3,439,935; G. E. Dodgson in U.S. Pat. No. 3,834,736; R. W. Joyce in U.S. Pat. No. 5,378,007, and N. R. Curry in U.S. Pat. No. 6,231,064.

SUMMARY OF THE INVENTION

The invention comprises a truck and trailer combination having cooperating coupling structures for removable mounting the trailer on the frame members of the truck. The truck is a conventional semi-tractor having longitudinal frame members. Longitudinal channel members are secured to the frame members. A fifth wheel hitch mounted on the frame members is located between the channel members. The trailer has longitudinal trails and a kingpin. The kingpin locks onto the fifth wheel hitch when the rails are located in the channel members. Lock devices, such as pins, secure the rails to the channel members whereby the trailer is fixed on the channel members. The fifth wheel hitch is released and the lock devices are released or removed from the rails and channel members to allow the tractor to separate from the trailer. The tractor and its fifth wheel hitch are usable with a conventional semi-trailer. The utility of the tractor is enhanced as it can be used with the tractor mounted trailer, a container or a conventional semi-trailer.

DESCRIPTION OF THE INVENTION

Figure 1:
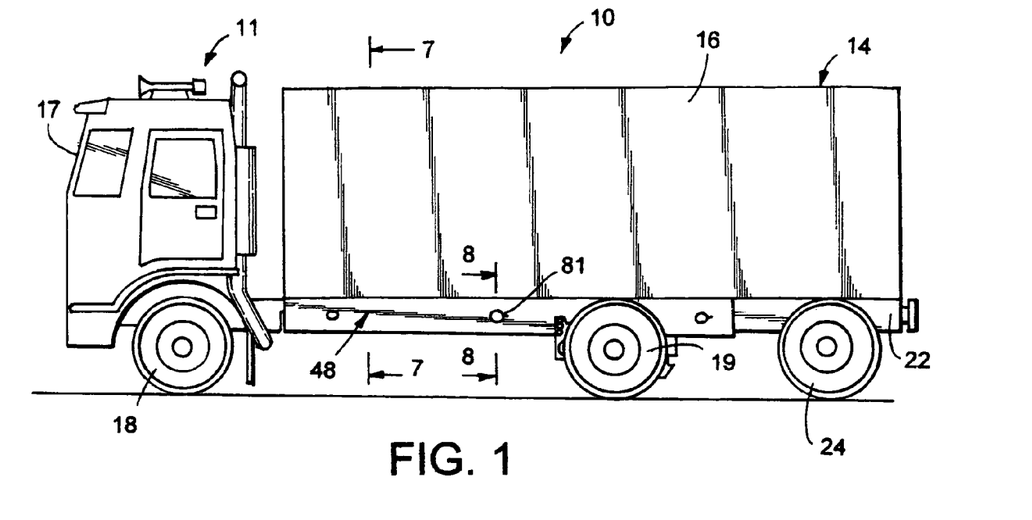
FIG. 1 is a side elevational view of a combined motor truck and trailer of the invention.

A combined truck and trailer 10, shown in FIG. 1, has a tractor 11 having longitudinal laterally spaced frame members 12 and 13 and a trailer 14 having a container or box 16 mounted on the frame members 12 and 13. Tractor 11 is illustrated as a conventional semi-truck tractor having a driver's cab 17 mounted on the front sections of frame members 12 and 13 above front steering wheels 18. Drive wheels 19 and 21 are operatively mounted on the rear sections of frame members 12 and 13. Wheels 19 and 21 can be dual tandem wheels. Frame members 12 and 13 are channel beams extended between the front and rear wheels 18 and 19.

Figure 5:
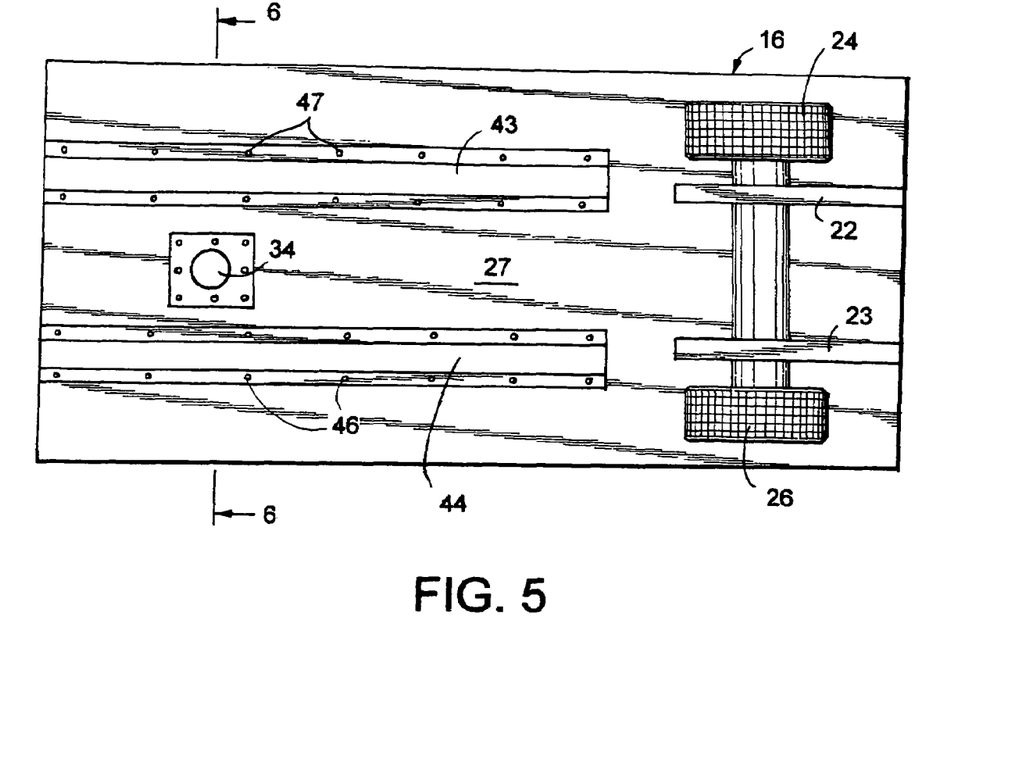
FIG. 5 is a bottom plan view of the trailer shown in FIG. 1.
Figure 6:
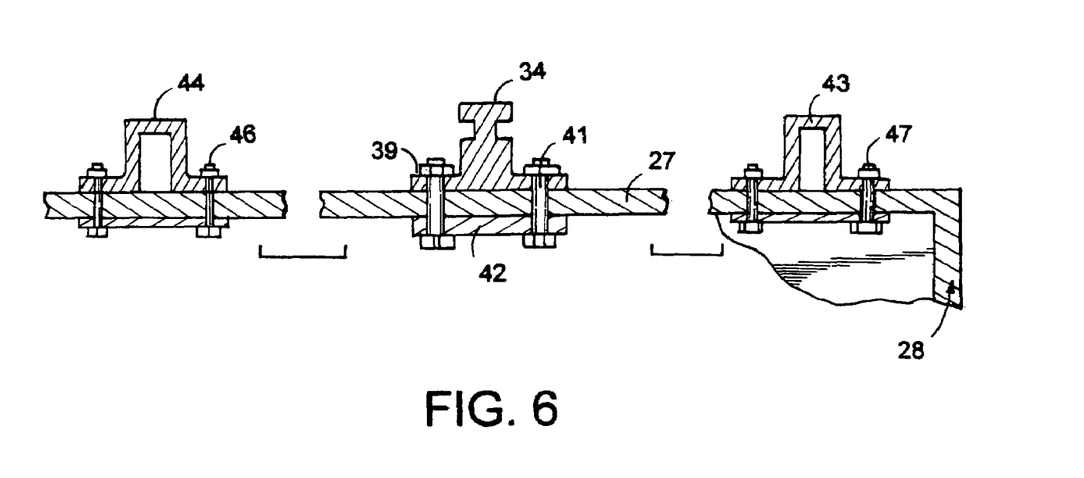
FIG. 6 is a foreshortened and enlarged sectional view taken along line 6-6 of FIG. 5.
Figure 7:
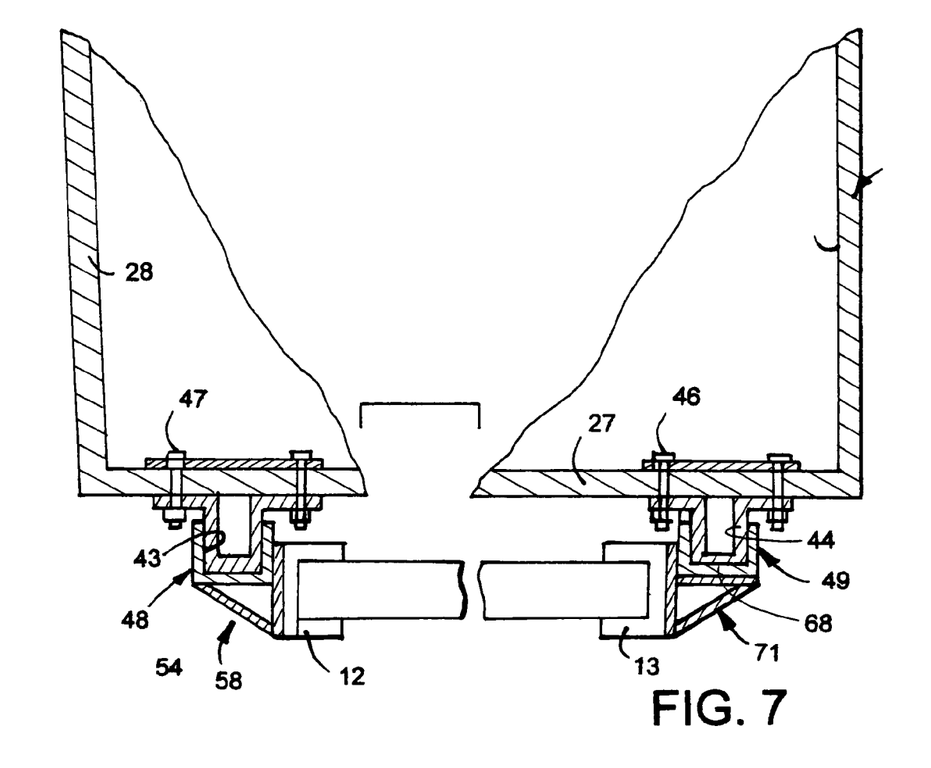
FIG. 7 is a foreshortened and enlarged sectional view taken long line 7-7 of FIG. 1.

Trailer 14 has a rectangular-shaped container or box 16 attached to suspension members 22 and 23, such as springs, air cylinders and shock absorbers, connected to rear drive wheels 24 and 26. As shown in FIGS. 5, 6 and 7, trailer 14 has a bed or floor 27 and upright side walls 28 and 29. Trailer 14 can have a flat bed, an open top, a roof, a retractable tarp, doors and windows. An example of an enclosed container is a fifth wheel travel trailer. The trailer can be a tank for carrying liquid and gas products. Trailer 14 is removable from tractor 11 whereby the tractor can be used with a conventional semi-truck trailer or a container having a different configuration and utility.

Figure 2:
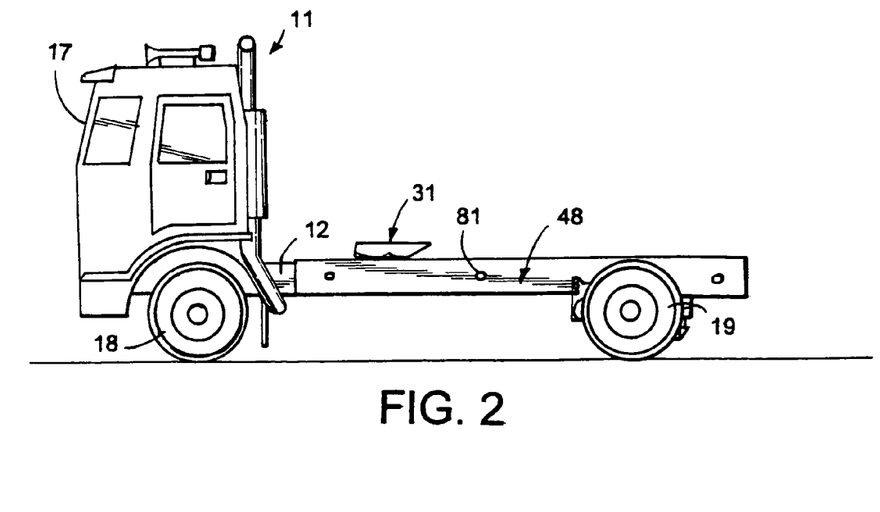
FIG. 2 is a side elevational view of the truck shown in FIG. 1.
Figure 3:
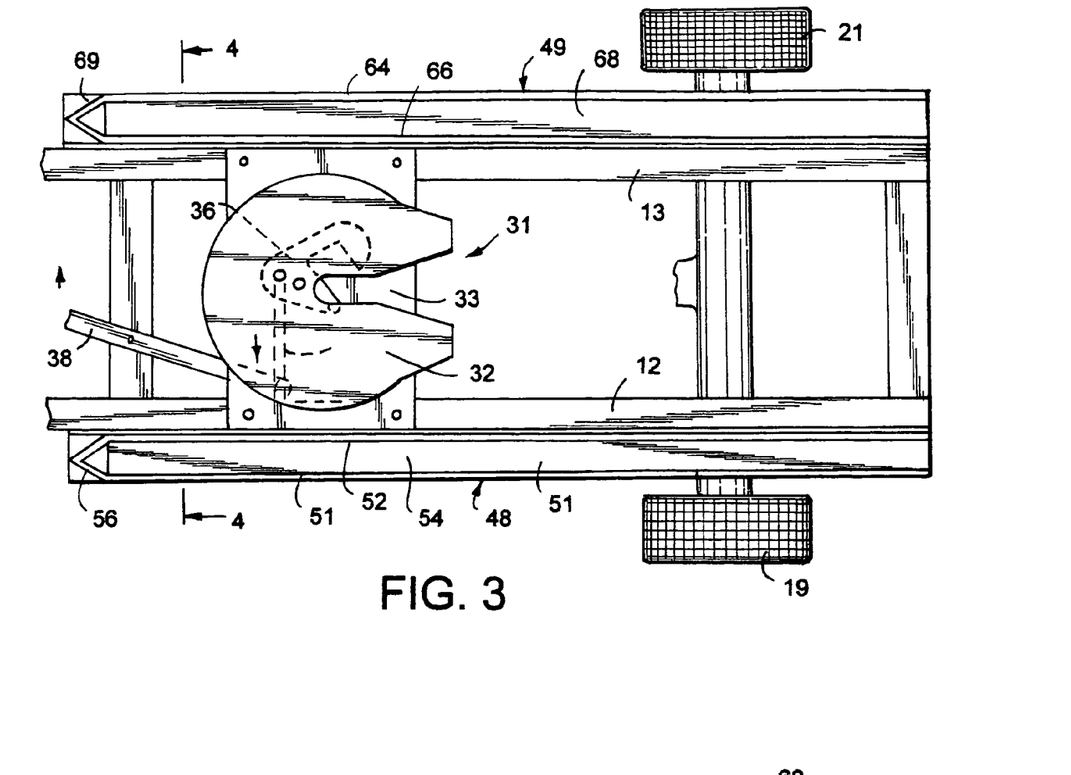
FIG. 3 is a top plan view of the truck frame and channel members secured to the frame.

As shown in FIGS. 2 and 3, a fifth wheel hitch 31 is mounted on frame members 12 and 13 rearwardly of cab 17. The longitudinal location of fifth wheel 31 relative to frame members 12 and 13 can be adjusted. Examples of longitudinally adjustable fifth wheel hitches are disclosed by M. Ramun in U.S. Pat. No. 2,860,891 and W. H. Frampton and Alfred M. Bos in U.S. Pat. No. 4,429,892. Other mounting devices can be used to secure the fifth wheel hitch to frame members 12 and 13. Fifth wheel hitch is a conventional hitch having a generally circular platform or plate 32 with a longitudinal channel 33 for accommodating a kingpin 34, shown in FIGS. 5 and 6. A latch 36 pivots between a lock position to retain kingpin 34 in the base of channel and an unlock position to allow tractor 11 to be separated from fifth wheel hitch 31. A hitch release rod 37 connected to latch 36 is manually moved to move latch 36 to its unlock position. A lever 38 connected to rod 37 is used to apply force to rod 37 to move rod 37 to the release position. An example of a fifth wheel release mechanism is disclosed by W. F. Hollis and W. E. Hollis Jr. in U.S. Pat. Nos. 5,863,060 and 6,201,252. Other hitch release devices can be used to move latch 36 to its unlock position. Returning to FIGS. 5 and 6, kingpin 34 is secured with a plurality of bolts 39 and 41 to a front center section of bed 27 of container 16. Bolts 39 and 41 extend through a plate 42 and bed 27 to firmly secure kingpin 34 to container 16. A pair of longitudinal rails 43 and 44 are secured with bolts 46 and 47 to bed 27 on opposite sides of kingpin 34. Rails 43 and 44 are linear U-shaped members having side flanges for accommodating bolts 46 and 47. Rails 43 and 44 can have other shapes such as box beams, I-beams, H-beams and solid bar stock.

Figure 4:
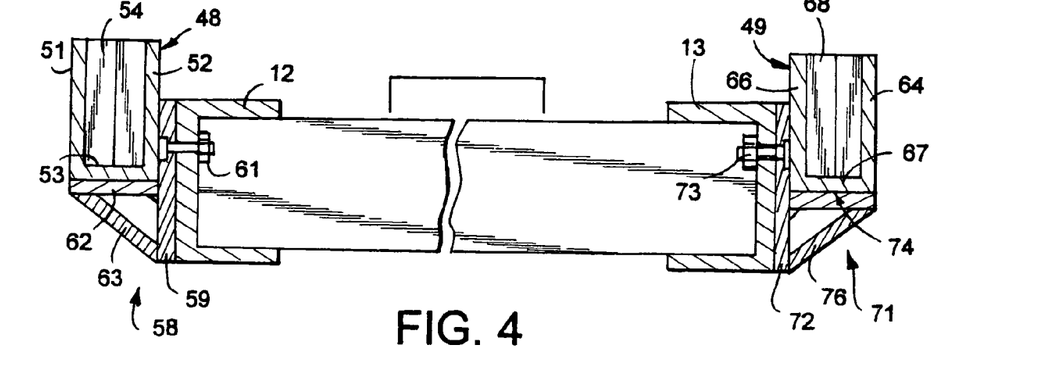
FIG. 4 is a foreshortened enlarged sectional view taken along line 4-4 of FIG. 3.

As shown in FIGS. 3 and 4, channel members 48 and 49 extend longitudinally adjacent frame members 12 and 13. Member 48 has upright straight side walls 51 and 52 joined to a horizontal bottom wall 53 providing an open top horizontal groove 54. A V-shaped stop 56 secured to the front end of channel member 48 limits the forward location of container 16 relative to channel member 48. A bracket 58 supports channel member 48 on frame member 12. As shown in FIG. 4, bracket 58 comprises a vertical plate 59 attached with fasteners 61 to the outside of frame member 12. An outwardly directed horizontal shelf 62 secured with welds to a middle section of plate 59 is reinforced with a gusset plate 63. Channel member 48 is secured with welds to plate 59 and shelf 62. Other structures can be used to attach channel member 48 to frame member 12. Channel member 49 mounted on frame member 13 has upright side walls 64 and 66 joined to a horizontal bottom wall 67 providing an open top longitudinal groove 68. A V-shaped stop 69 secured to the front ends of walls 64 and 66 limits the location of the trailer 14 on tractor 11. Stop 69 is transversely aligned with stop 56 and shown in FIG. 3. A bracket 71 mounts channel member 49 adjacent the outside of frame member 13. Bracket 71 includes an upright plate 72 located in surface contact with the outside wall of frame member 13. A fastener 73, such as a bolt, holds plate 72 on frame member 13. Other fastening devices can be used to connect plate 72 to framework 13. A horizontal longitudinal shelf 73 attached to plate 72 is reinforced with a gusset 76. Other structures can be used to mount channel member 49 on frame member 13. The channel member 49 can be fastened or welded directly to frame member 13.

Figure 8:
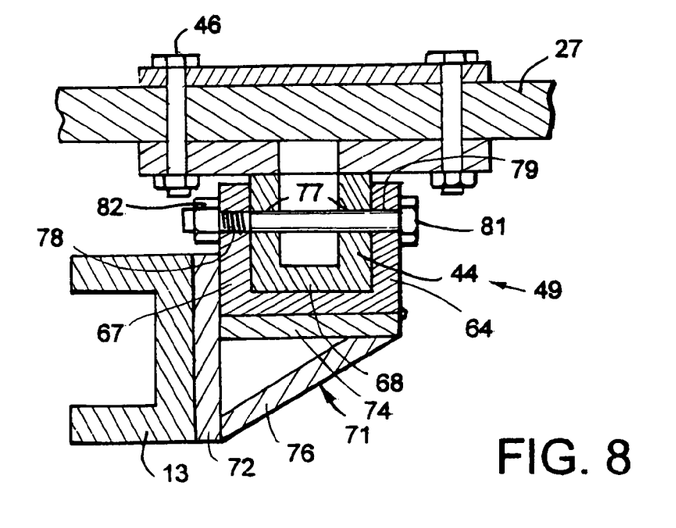
FIG. 8 is an enlarged sectional view taken along the line 8-8 of FIG. 1.
Figure 9:
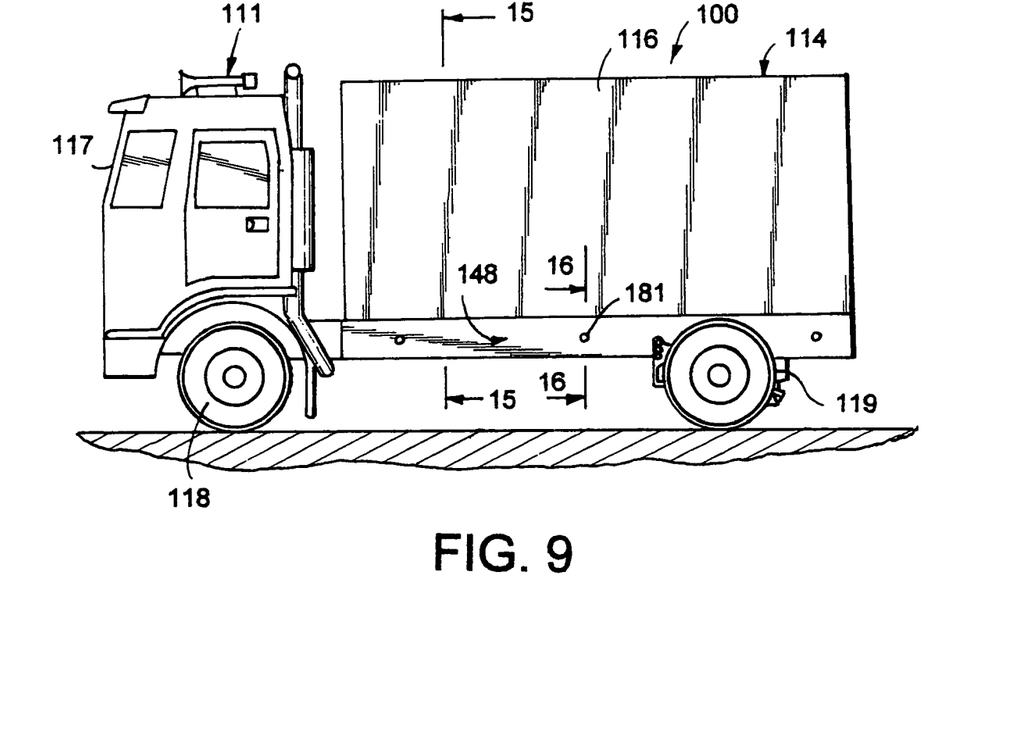
FIG. 9 is a side elevational view of a modification of the combined motor truck and container.
Figure 10:
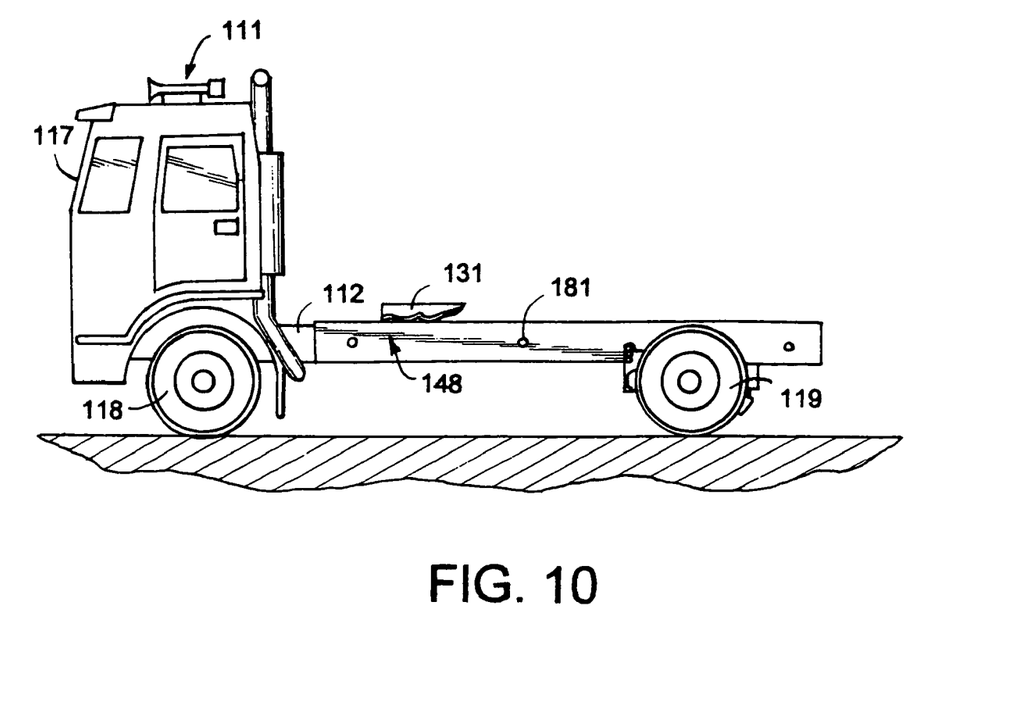
FIG. 10 is a side elevational view of the truck shown in FIG. 9.
Figure 11:
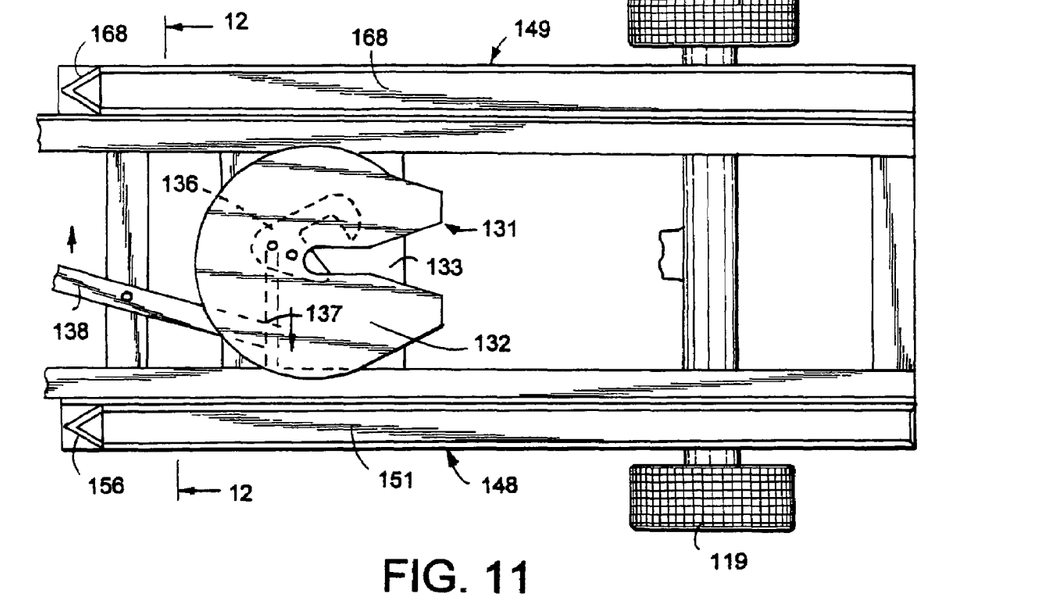
FIG. 11 is a top plan view of the truck frame and channel members secured to the frame.
Figure 12:
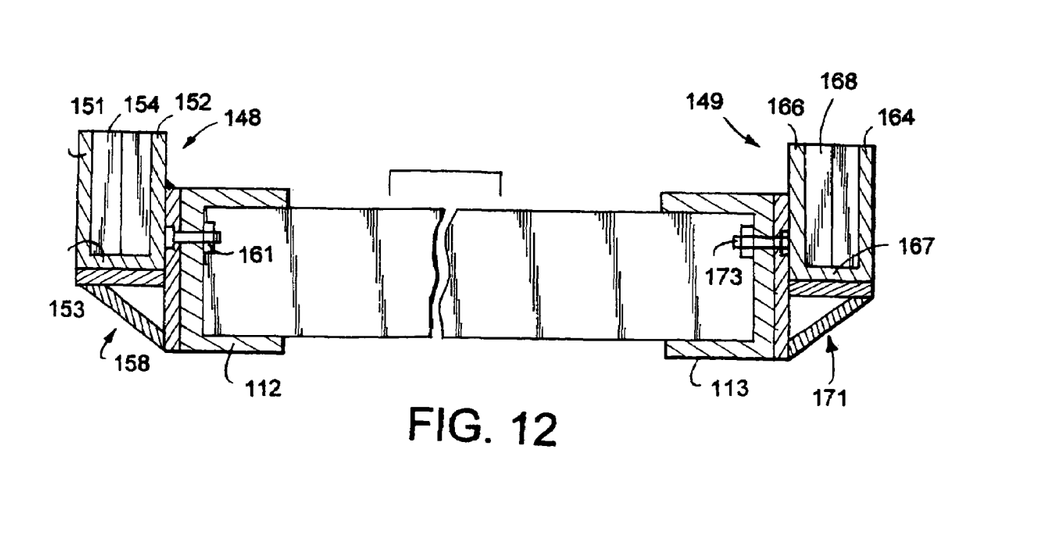
FIG. 12 is a foreshortened and enlarged sectional view taken along the line 12-12 of FIG. 11.
Figure 13:
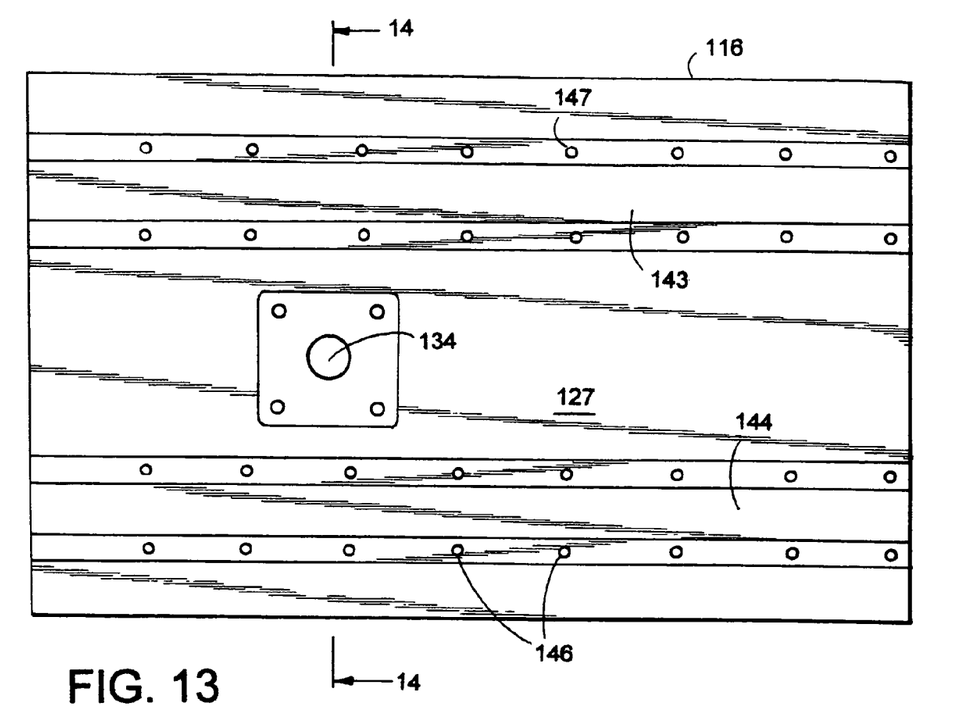
FIG. 13 is a bottom plan view of the container.
Figure 14:
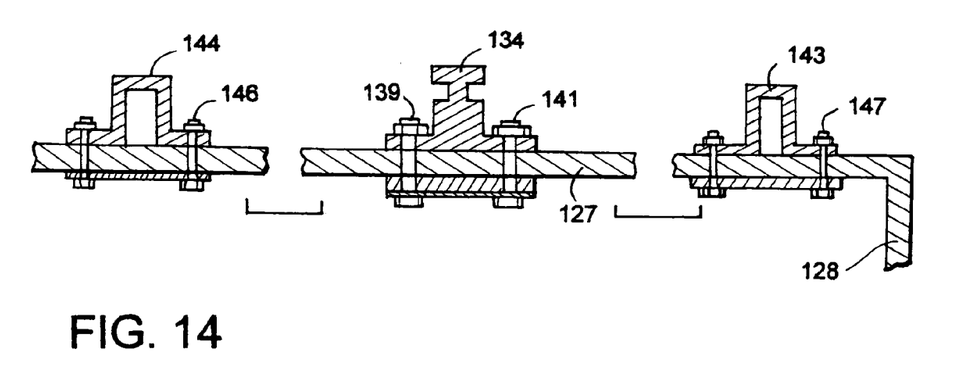
FIG. 14 is a foreshortened and enlarged sectional view taken along the line 14-15 of FIG. 13.

As shown in FIGS. 7 and 8, trailer 14 is mounted on tractor frame members 12 and 13. Rails 43 and 44 are located with a slide fit in the longitudinal grooves 54 and 68 of channel members 48 and 49. The opposite sides of rails 43 and 44 engage side walls of channel members 48 and 49 to prevent lateral shifting of trailer 14 relative to channel members 48 and 49. The front ends of rails 43 and 44 engage stops 56 and 69 to longitudinally position rails 43 and 44 on channel members 48 and 49 and align the holes 77 in rails 43 and 44 with holes 78 and 79 in channel members 48 and 49. As shown in FIG. 8, a pin 81 extends through holes 77, 78 and 79 locks rail 44 to channel member 49. A plurality of pins are used to lock rails 43 and 44 to channel members 48 and 49. Pin 81 is threaded into a nut 82 welded to the side wall 67 of channel member 49. Other structures including locking pins movable with air or hydraulic cylinders can be used to connect rails 43 and 44 to channel members 48 and 49. Kingpin 34 is in locking engagement with fifth wheel hitch 31.

Figure 15:
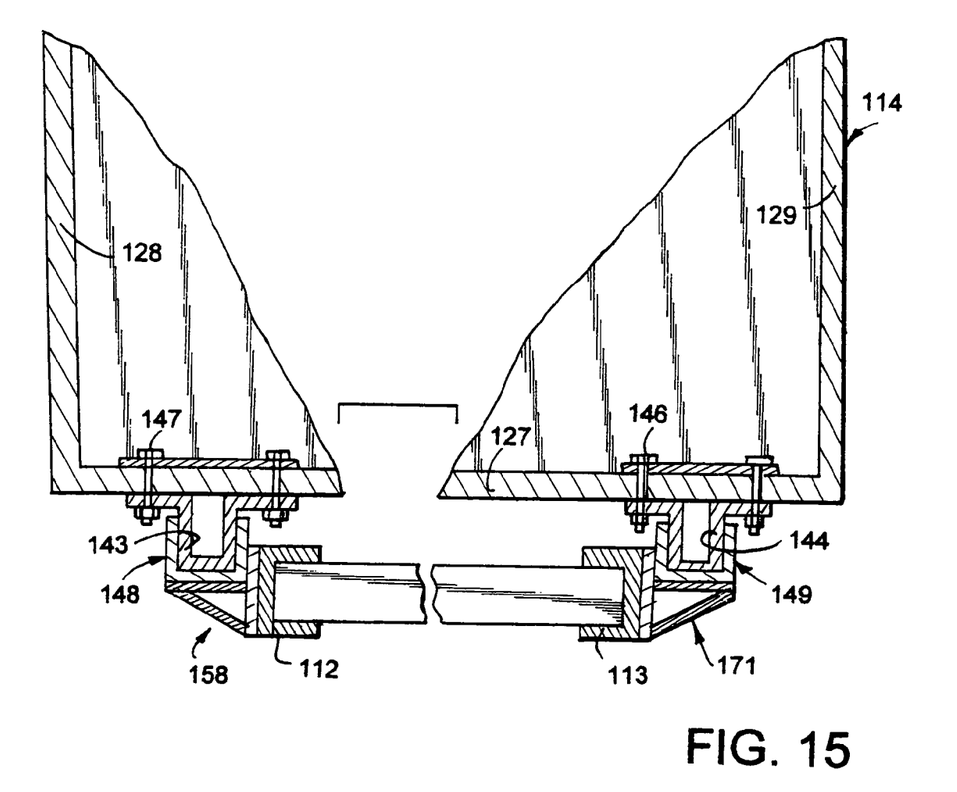
FIG. 15 is a foreshortened and enlarged sectional view taken along the line 15-15 of FIG. 9.
Figure 16:
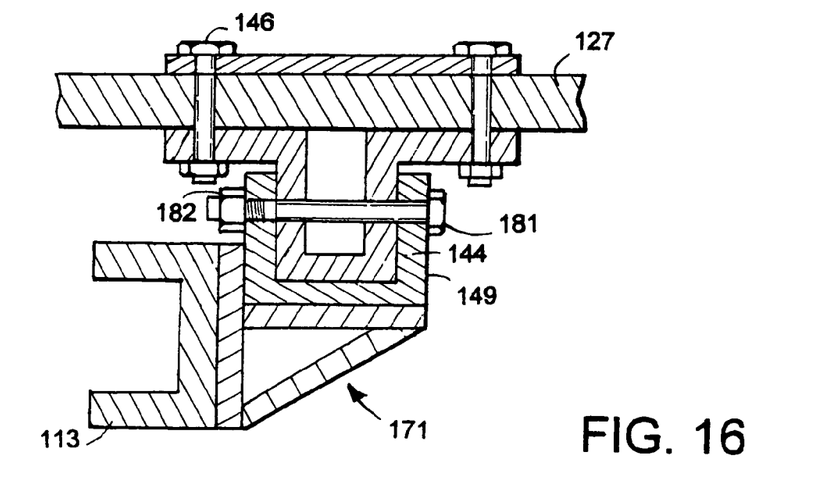
FIG. 16 is an enlarged sectional view taken along the line 16-16 of FIG. 9.

A modification of the tractor and trailer combination 100 is shown in FIGS. 9 to 15. The wheel assemblies of the trailer has been removed whereby the trailer is a container or a box mounted on the tractor frame members. The fifth wheel hitch 113 also connects the front of the container to the frame members. The parts of the tractor and container that correspond to the parts of tractor 11 and trailer 14 have the same reference number with the prefix 1. As shown in FIGS. 15 and 16, pin 181 locks rail 144 to channel member 144. Additional pins lock rail 143 to channel member 148. Kingpin 134 is located in locking engagement with fifth wheel hitch 131. Container 116 is removed from tractor 111 by releasing fifth wheel hitch 131 and removing pins 181 whereby tractor 111 is moved away from container 116. Support legs or other lift structures (not shown) are used to hold container 116 in an elevated position. Fork lifts can be used to remove container from tractor 111.

The combined tractor and trailer and cooperating coupling structure on the tractor and trailer ahs been described with reference to specific embodiments thereof. Variations and modifications of the coupling structure and arrangement of the structures can be made by persons skilled in the art without departing from the scope of the invention.

The invention claimed is:

1. A tractor and trailer combination comprising: a tractor having longitudinal first and second frame members, a fifth wheel hitch mounted on the frame members, a first U-shaped channel member having a longitudinal groove, a first bracket connecting the first U-shaped channel member having a longitudinal groove, a first bracket connecting the first U-shaped channel member to the first frame member, a second U-shaped channel member having a longitudinal groove located generally parallel to the first U-shaped channel member, a second bracket connecting the second U-shaped channel member to the second frame member, a trailer having a bottom bed, a kingpin secured to the bed adapted to lock onto the fifth wheel hitch, wheels operatively connected to a rear portion of the bed, a first longitudinal rail secured to the bed, a second longitudinal rail located generally parallel to the first rail secured to the bed, said first and second rails being located in said longitudinal grooves of the first and second U-shaped channel members when the kingpin is locked onto the fifth wheel hitch, and releasable members securing the first and second rails to the first and second U-shaped channel members.

2. The tractor and trailer combination of claim 1 wherein: the first and second U-shaped channel members have front ends, and stop members secured to the front ends of the U-shaped channel members to longitudinally locate the first and second rails on the first and second U-shaped channel members.

3. The tractor and trailer combination of claim 1 wherein: the first and second rails each comprise a linear U-shaped member.

4. The tractor and trailer combination of claim 1 wherein: the first and second U-shaped channel members each have laterally spaced upright side walls, and each of said first and second rails having wall portions located in engagement with said side walls of the U-shaped channel members to limit lateral movement of the trailer relative to the tractor.

5. The tractor and trailer combination of claim 1 wherein: said releasable members comprise pins extended through holes in the first and second U-shaped channel members and first and second rails for securing the first and second rails to the first and second U-shaped channel members.

6. A tractor and trailer combination comprising: a tractor having a longitudinal frame, a fifth wheel hitch mounted on the frame, channel members having longitudinal grooves secured to the frame of the tractor, a trailer having a bottom bed, a kingpin secured to the bed of the trailer adapted to lock onto the fifth wheel hitch, wheels operatively connected to a rear portion of the bed of the trailer, longitudinal rails secured to the bed of the trailer located in the longitudinal grooves and in engagement with the channel members when the kingpin is locked onto the fifth wheel hitch, the channel members having front ends, stop members secured to the front ends of the channel members to longitudinally locate the rails on the channel members, and releasable members securing the rails to the channel members.

7. The tractor and trailer combination of claim 6 wherein: the rails comprise linear U-shaped members.

8. The tractor and trailer combination of claim 6 wherein: the channel members have laterally spaced upright side walls, said rails having wall portions located in engagement with said side walls to limit lateral movement of the trailer relative to the tractor.

9. The tractor and trailer combination of claim 6 wherein: the releasable members comprise pins extended through holes in the channel members and rails for securing the rails to the channel members.

10. A tractor and trailer combination comprising: a tractor having a longitudinal frame, channel members having longitudinal grooves secured to the frame of the tractor, a trailer having a bottom bed, wheels operatively connected to a rear portion of the bed of the trailer, longitudinal rails secured to the bed located in the longitudinal grooves and in engagement with the channel members, the channel members having front ends, stop members secured to the front ends of the channel members to longitudinally locate the rails on the channel members, and releasable members securing the rails to the channel members.

11. The tractor and trailer combination of claim 10 wherein: the rails comprise linear U-shaped members.

12. The tractor and trailer combination of claim 10 wherein: the channel members have laterally spaced upright side walls, said rails having wall portions located in engagement with said side walls to limit lateral movement of the trailer relative to the tractor.

13. The tractor and trailer combination of claim 10 wherein: the releasable members comprise pins extended through holes in the channel members and rails for securing the rails to the channel members.

14. A tractor and container combination comprising: a tractor having a longitudinal frame, a fifth wheel hitch mounted on the frame, channel members having longitudinal grooves secured to the frame of the trailer, a container having a bottom bed, a kingpin secured to the bed of the container adapted to lock onto the fifth wheel hitch, longitudinal rails secured to the bed of the container located in the longitudinal grooves and in engagement with the channel members when the kingpin is locked onto the fifth wheel hitch, the channel members having front ends, stop members secured to the front ends of the channel members to longitudinally locate the rails on the channel members, and releasable members securing the rails to the channel members.

15. The tractor and container combination of claim 14 wherein: the rails comprise linear U-shaped members.

16. The tractor and container combination of claim 14 wherein: the channel members have laterally spaced upright side walls, said rails having wall portions located in engagement with said side walls to limit lateral movement of the container relative to the tractor.

17. The tractor and container combination of claim 14 wherein: the releasable members comprise pins extended through holes in the channel members and rails for securing the rails to the channel members.

18. A tractor and container combination comprising: a tractor having a longitudinal frame, channel members having longitudinal grooves secured to the frame of the tractor, a container having a bottom bed, longitudinal rails secured to the bed of the container located in the longitudinal grooves and in engagement with the channel members, the channel members having front ends, stop members secured to the front ends of the channel members to longitudinally locate the rails on the channel members, and releasable members securing the rails to the channel members.

19. The tractor and container combination of claim 18 wherein: the rails comprise linear U-shaped members.

20. The tractor and container combination of claim 18 wherein: the channel members have laterally spaced upright side walls, said rails having wall portions located in engagement with said side walls to limit lateral movement of the container relative to the tractor.

21. The tractor and container combination of claim 18 wherein: the releasable members comprise pins extended through holes in the channel members and rails for securing the rails to the channel members.

22. A tractor and container combination comprising: a tractor having a frame, a fifth wheel hitch mounted on the frame, first members connected to the frame, fasteners securing the first members to the frame, a container having a bottom member, a kingpin secured to the bottom member adapted to lock onto the fifth wheel hitch, second members connected to the bottom member of the container, fasteners securing the second members to the bottom member of the container in alignment with the first members, said first and second members cooperating to mount the container on the frame of the vehicle when the kingpin is locked onto the fifth wheel hitch, and members securing the first members to the second members to retain the container on the first members.

23. The tractor and container combination of claim 22 wherein: the first and second members are cooperating rail and channel members.

24. The tractor and container combination of claim 22 wherein: the first members have front ends, stop members on the front ends of the first members to longitudinally locate the second members on the first members.

25. The tractor and container combination of claim 22 including: wheels operatively connected to the bed rearwardly of the frame of the tractor.

26. The tractor and container combination of claim 22 wherein: the first members comprise channel members having front ends, stop members secured to the front ends of the channel members, said second members comprise rails secured to the bottom member of the container, said rails adapted to engage the stop member to locate the rails on the channel members.

27. The tractor and trailer combination of claim 26 wherein: the channel members have laterally spaced upright side walls, said rails having wall portions located in engagement with said side walls to limit lateral movement of the container relative to the tractor.

28. The tractor and container combination of claim 26 wherein: the releasable members comprise pins extended through holes in the channel members and rails for securing the rails to the channel members.

29. A tractor and container combination comprising: a tractor having a frame, a fifth wheel hitch mounted on the frame, first members connected to the frame, fasteners securing the first members to the frame, a container having a bottom member, second members connected to the bottom member of the container, fasteners securing the second members to the bottom member of the container in alignment with the first members, said first and second members cooperating to mount the container on the frame of the vehicle, and members securing the first members to the second members to retain the container on the first members.

30. The tractor and container combination of claim 29 wherein: the first and second members are cooperating rail and channel members.

31. The tractor and container combination of claim 29 wherein: the first members have front ends, stop members on the front ends of the first members to longitudinally locate the second members on the first members.

32. The tractor and container combination of claim 29 including: wheels operatively connected to the bed rearwardly of the frame of the tractor.

33. The tractor and container combination of claim 29 wherein: the first members comprise channel members having front ends, stop members secured to the front ends of the channel members, said second members comprise rails secured to the bottom member of the container, said rails adapted to engage the stop member to locate the rails on the channel members.

34. The tractor and trailer combination of claim 33 wherein: the channel members have laterally spaced upright side walls, said rails having wall portions located in engagement with said side walls to limit lateral movement of the container relative to the tractor.

35. The tractor and container combination of claim 33 wherein: the releasable members comprise pins extended through holes in the channel members and rails for securing the rails to the channel members.

* * * * *